US005227584A

United States Patent [19]

Holmström et al.

[11] Patent Number: 5,227,584

[45] Date of Patent: Jul. 13, 1993

[54] BARRIER OF CONDENSER TYPE FOR FIELD CONTROL IN TRANSFORMER BUSHING TERMINALS

[75] Inventors: Lars Holmström, Ludvika; Lennart Strandberg, Sunnansjo, both of Sweden

[73] Assignee: Asea Brown Boveri AB, Vasteras, Sweden

[21] Appl. No.: 874,976

[22] Filed: Apr. 22, 1992

Related U.S. Application Data

[63] Continuation of Ser. No. 539,209, Jun. 18, 1990.

[30] Foreign Application Priority Data

Jun. 19, 1989 [SE] Sweden ............................ 8902218

[51] Int. Cl.[5] ........................................ H02G 15/072

[52] U.S. Cl. ................................ 174/73.1; 174/143; 174/DIG. 10

[58] Field of Search ............... 174/73.1, 143, DIG. 10

[56] References Cited

U.S. PATENT DOCUMENTS 2,852,596 9/1958 Prince .............................. 174/73.1

3,746,935 7/1973 Wagenaar et al. ............ 174/143 X

FOREIGN PATENT DOCUMENTS 112757 4/1941 Australia .......................... 174/73.1

*Primary Examiner*—Leo P. Picard

*Assistant Examiner*—Hyuny S. Songh

*Attorney, Agent, or Firm*—Watson, Cole, Grindle & Watson

[57] ABSTRACT

The invention relates to a condenser type barrier for field control in transformer bushings and their connection to the conductor of a transformer winding for transformers used in HVDC converter plants. The condenser barrier is arranged as a solid of revolution with concentrically laid condenser layers. It is formed from both ends with inwardly-directed, straight frustums of cones with equally large smallest bases, between which the condenser barrier is formed as a concentric inner, straight circular cylinder.

6 Claims, 1 Drawing Sheet

BARRIER OF CONDENSER TYPE FOR FIELD CONTROL IN TRANSFORMER BUSHING TERMINALS

This application is a file wrapper continuation application of application Ser. No. 539,209, filed Jun. 18, 1990.

TECHNICAL FIELD

The present invention relates to a condenser type barrier (in the following referred to as "condenser barrier") for field control of the connection of a transformer bushing to the conductor of a transformer winding. The condenser barrier is especially designed for application in connection with transformers which are connected to HV converters.

BACKGROUND ART, DISCUSSION OF THE PROBLEM

If in a vessel with transformer oil two energized electrodes are positioned at a certain distance from each other, at a certain voltage a flashover will occur between the electrodes. The flashover tendency may be minimized by inserting between the electrodes an insulator body which functions as a barrier.

Transformer bushings may comprise an upper insulator and a lower insulator of electric porcelain. At the joint between these there is a flange which is connected to the transformer casing. In the centre of the bushing there is a tube on which is wound a condenser body to obtain a favourable electrical field distribution. The current can be conducted through the tube or a flexible conductor drawn through the tube.

Power transformers which are used in converter plants entail special problems from the point of view of insulation, which somehow have to be overcome in order to ensure a satisfactory function.

In high voltage direct current (HVDC) plants, there is often used at least one converter per pole and station. Normally, also, several bridges are connected in series. One of the poles of a bridge is normally connected to ground and the other pole is connected to the next bridge, thus obtaining a series connection. The direct voltage potential of the respective bridge relative to ground is then increased according to the number of bridges which are connected in series.

Each bridge in the series connection is supplied with alternating voltage from a separate transformer. With increasing direct voltage potential on the bridges relative to ground, the insulation on bushings and windings on the transformers which are connected to the bridges will also be subjected to an increasingly higher direct voltage potential with a superimposed alternating voltage. The insulation of these must therefore be dimensioned so that they are capable of withstanding the increasingly higher insulating stresses to which they are then subjected.

The increasing direct voltage potential leads to special problems which do not exist in transformers used for pure alternating voltage transformation.

For converter transformers, the lower insulator and the transition between the conductor of the transformer winding and the bushing present areas of problems from the point of view of insulation technique. This is described, inter alia, in Power Transmission by Direct Current, by E. Uhlmann, Springer Verlag 1975, pages 327–328.

The electric direct voltage field has a distribution different from that of the alternating voltage field. The distribution of the direct voltage is mainly determined by the resistivity of the various insulating mediums. It is true that both transformer oil, cellulose material and electric porcelain are good insulators, but a certain amount of electric current is conducted in these materials. The relation between the resistivity of cellulose material and transformer oil is about 100. This means that the cellulose in series with oil is subjected to considerably higher fields than the oil, which in turn, therefore, imposes demands for a sufficient amount of solid insulating material in order not to exceed the electric withstand strength. The field distribution as well as the field directions will thus be different from the case with alternating voltage. The current transport also entails a redistribution of charges in the insulating mediums used.

Because of the heavy dependence of the resistivity on moisture content, field strength, temperature, etc., the distribution of direct current is difficult to predict. In addition, the physical nature of the direct voltage, i.e. charge transport, charge, time-dependent behaviour, and so on, gives a picture of the insulation problems arising in connection with HVDC plants, which is very complex and difficult to interpret. In "Space Charge and Field Distribution in Transformers under DC-stress" by U Gäfvert and E. Spicar, CIGRE Int. Conference on Large High Voltage Electric Systems, 1986 Session, 12-04, the complexity of the direct voltage distribution is illustrated. As previously mentioned, problems have arisen at the connection between the transformer bushing and the conductor of the transformer winding. This has led to the lower insulator of electric porcelain having to be removed in order to manage the stresses at the HVDC terminal at the higher voltage levels.

No simple explanation of the above phenomenon has been presented. However, there are reasons to suspect that the long surfaces which arise in connection with bushings for high voltages in combination with the direction of the field along the long surfaces are of importance in this connection. Admittedly, also the alternating voltage field is directed along the surface of the lower porcelain, but its physical nature is different. One hypothesis is that the distribution of the direct voltage field runs the risk of becoming unstable and unevenly distributed along sufficiently long surfaces. Another interesting hypothesis is described in an article entitled "Effect of Duct Configuration on Oil Activity at Liquid/Solid Dielectric Interfaces" by R. E. James, F. E. Trick, R. Willoughby in Journal of Electrostatics, 12, 1982, pages 441–447. In this article it is stated that increased charge transport at surfaces caused by turbulence and access to charge is the reason for low electric withstand strength.

As an example of the state of the art there may be mentioned the condenser body in a muff for direct connection of oil cables to transformers, described, inter alia, in Swedish patent specification 214 015 and in ASEA Journal 1963, volume 36, numbers 1–2, page 23. That part of the muff which extends into the transformer is substantially formed as the lower part of a conventional transformer bushing, i.e. with a lower insulator of electric porcelain. The condenser body of the muff is here designed so as to give capacitive voltage control both inwards along the cable end coming from outside and outwards along the porcelain insulator.

SUMMARY OF THE INVENTION

As has been described above, the invention relates to a condenser barrier for field control in transformer bushings and the connection of this barrier to the conductor of a transformer winding for transformers used in HVDC converter plants. The task of the condenser barrier is to overcome the flashovers which have proved to arise at the transition between transformer bushings and the conductor of the transformer. The condenser barrier is designed so as to function as a barrier with both capacitive and resistive control of the electrical field and is dimensioned so that the condenser barrier withstands the voltages and fields occurring in this region.

It is assumed that the transformer bushing is provided with a lower insulator which is conically tapering viewed from the flange.

It is further assumed that the conductor coming from the transformer winding and which is to be connected to the electric conductor of the bushing is surrounded by a conducting tube which has an external, wound shield of insulating material. This shield has a conical shape which, in a similar manner, tapers towards the lower insulator and which has largely the same conicity as the lower insulator.

The condenser barrier is built up as a condenser body, i.e. it consists of an insulating material and condenser layers of foil type concentrically laid into the insulating material.

Characteristic of the condenser barrier according to the invention is substantially the geometrical shape of the condenser barrier to make it function as a barrier to both direct voltage and alternating voltage fields.

The condenser barrier is formed as a solid of revolution and has, in its ordinary embodiment, a straight circular cylindrical outer shape. However, it may be formed with a "waist" or "belly", which influences the distribution of the DC fields.

From one end the condenser barrier is formed as an inwardly directed, first straight frustum of a cone which is largely adapted to surround the lower insulator, i.e. it has its largest base area at the end of the condenser barrier. Since both the condenser barrier and the lower insulator are in an oil-filled space, the gap between the lower insulator and the first straight frustum of a cone will be oil-filled. The conicity of this first cone, however, deviates somewhat from the conicity of the lower insulator. The reason for this somewhat different conicity will be explained below.

Concentrically in the condenser barrier, continuing from the smallest base area of the first, straight frustum of a cone, this condenser barrier is formed as a cylindrically open space.

From the second end of the condenser barrier, the barrier is formed as an inwardly directed, second straight frustum of a cone with a smallest base area which faces the concentric, cylindrical first space. This second cone is adapted to surround the shield on the conducting tube around the conductor extending from the transformer. Also with its second, straight frustum of a cone with a certain oil-filled gap, the condenser barrier will surround the shield. The conicity of this second cone also deviates somewhat from the conicity of the shield.

As mentioned above, the condenser barrier is made from an insulating agent with alternately laid condenser layers to obtain the desired capacitive control of the electric alternating field. The innermost condenser layer, which is concentric with the electric conductor, has an axial length approximately corresponding to the axial length of the inner concentric, cylindrical space. Outside of this there are applied short layers, concentrically alternating in a radial direction and tapering in an axial direction. These layers are laid so that, concurrently with the increasing radius of the condenser barrier, viewed from the first innermost layer, they are laid in an axial direction so that their outer edges face the straight frustums of cones of the condenser barrier.

As mentioned previously, the direct voltage field is controlled by several factors. Thus, for example, that medium which has the lowest resistivity is field controlling. Between the lower insulator and the surrounding body (the barrier) an oil gap is formed, as already mentioned. Since the oil has the lowest resistivity, most of the current is conducted in the oil gap which thus controls the field parallel to the surrounding surfaces. To obtain an even distribution of the field along these surfaces, it is therefore important that the width of the oil gap increases with decreasing radius. Otherwise, the field would be concentrated towards that part where the radius is smallest, i.e. where the axial sectional area is smallest. The conicity of the truncated cones of the condenser barrier is therefore suitably chosen such that the axial sectional area of the oil gap becomes approximately the same along all of the straight frustums of cones.

Another field-controlling part is the radial distribution of the field in the condenser barrier around the innermost layer to which high voltage is applied. Between the oil gap and the mid-portion of the condenser barrier, the layers function as equipotential lines in the direct voltage case, which prevents a concentration of the field near the bottom of the lower insulator. It is of importance that the layers of the condenser barrier are directed straight opposite to the layer of the bushing, so that the equipotential lines, with the aid of a correctly formed oil gap, are guided over in the desired manner between the bushing and the condenser barrier.

DESCRIPTION OF THE PREFERRED EMBODIMENTS

Figure 1:
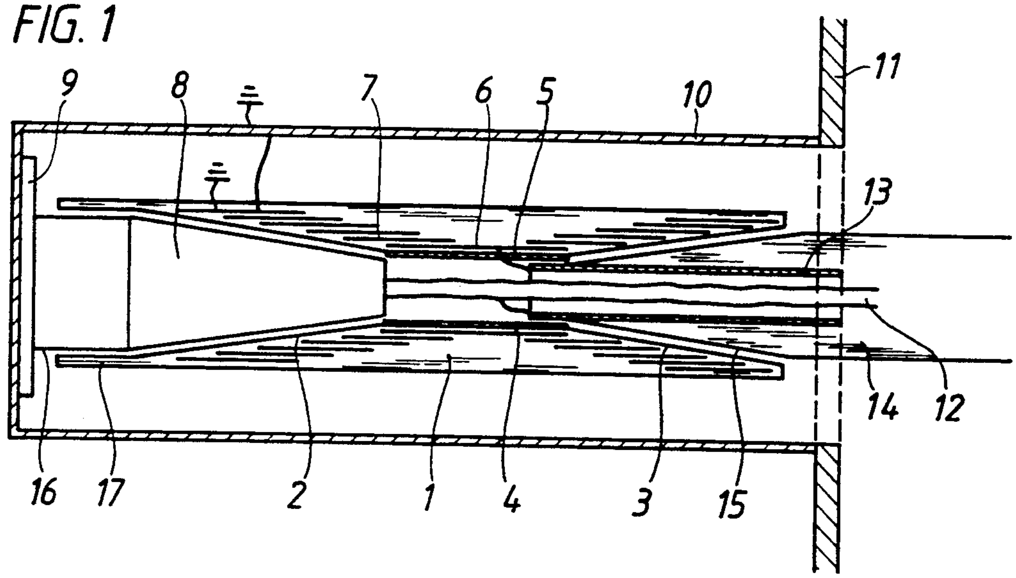
FIG. 1 shows a section through a lower insulator, a condenser barrier according to the invention, and the conductor of a transformer winding with a surrounding tube with insulation.

The accompanying figures show the appearance of a preferred embodiment of a condenser barrier according to the invention. The condenser barrier 1 is shown in a section through the axis of the barrier. Because of the inwardly-directed straight frustums of cones 2 and 3, the sectional view exhibits a parallel trapezoidal shape. The inner part 4 of the condenser barrier between the straight frustums of cones is cylindrically formed. To give the condenser barrier a certain mechanical stiffness, the inner cylindrical part has been wound onto a cylindrical tube 5. With another insulating material with a carrying capacity of its own, this tube would not be needed. The internal conical shape of the condenser barrier may otherwise be obtained in several different ways, for example by winding, turn by turn, an obliquely cut insulating material with a growing width. The inner condenser layer 6 has approximately the same axial extension as the previously mentioned concentric, cylindrical space. According as the insulating material is wound, there are laid between certain of the turns those condenser layers 7 which are needed for the capacitive voltage distribution. These layers have a shorter axial length than the innermost layer and are laid such that their outer edges, concurrently with the wound increasing radius of the condenser barrier, will be facing both of the straight frustoconical surfaces.

To show the invention in its proper context, a lower insulator is also shown at 8. The fastening flange of the bushing is shown at 9. In the example according to FIG. 1, the condenser barrier with its lower insulator is placed in an oil-filled intermediate flange 10 which is then connected to the transformer casing 11. The conductor of the transformer winding, which conductor is shown at 12, is to be connected to the electric conductor of the bushing in a known manner. As mentioned above, the conductor of the transformer winding is surrounded by a tube 13 of a conducting material. This tube is wound with several layers of insulating material which forms a shield 14 and which tapers towards the end of the tube in the form of a straight frustum of a cone 15. The tube 13 is electrically connected to both the conductor of the transformer winding and the inner condenser layer. One of the outer condenser layers is grounded.

As mentioned previously, it is important for the direct voltage field distribution that the oil gap between the straight frustums of cones of the condenser barrier and the lower insulator and the shield, respectively, has largely the same axial cross section along the whole cones. Therefore, the difference in radius is greatest between the smallest bases.

In certain designs, the lower insulator facing the fastening flange is purely cylindrically formed, as shown at 16. In these cases it may be suitable also for the condenser barrier to terminate in a cylindrical part 17 to cover this part of the lower insulator. A corresponding cylindrical extension may also occur in certain cases over the shield 14.

The axial length/height of the straight frustums of cones of the condenser barrier is adapted to the axial length of the cones of the lower insulator and the shield, respectively, and may therefore be of varying lengths, as is also clear from the figure.

Figure 2:
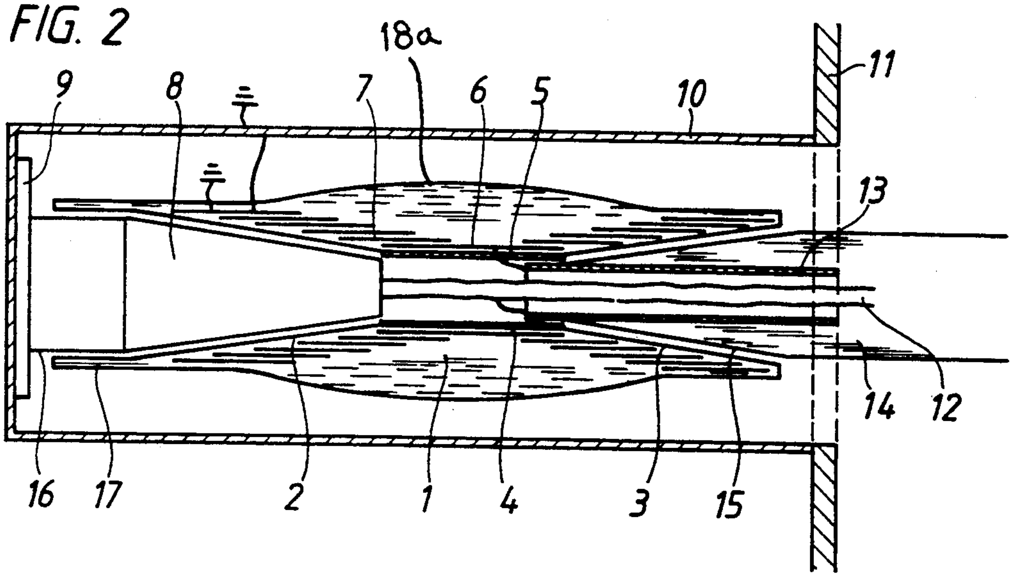
FIG. 2 shows the same section as FIG. 1, but with a "belly" portion in the center section of the condenser type barrier.
Figure 3:
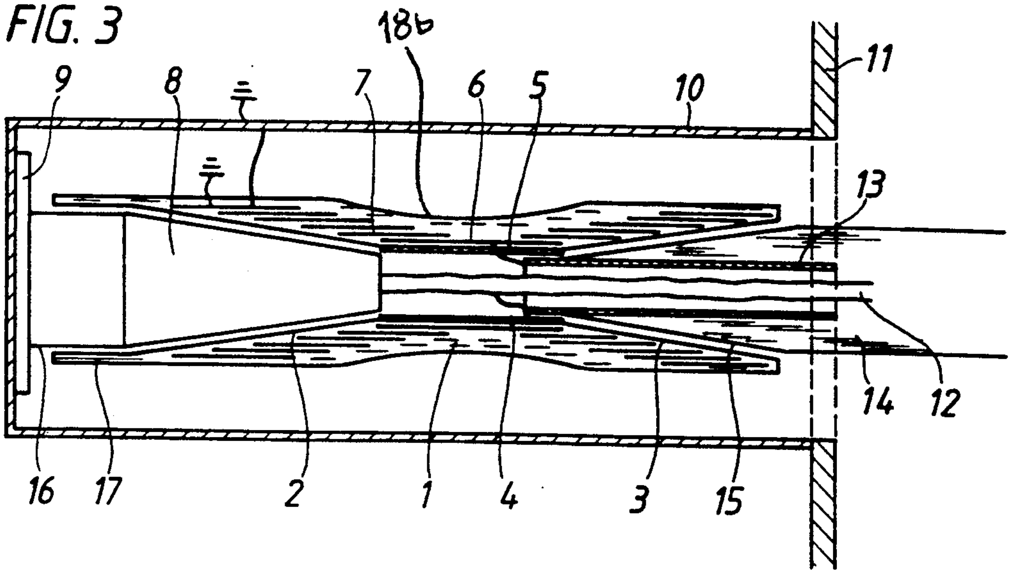
FIG. 3 shows the same section as FIG. 1, but with a "waist" portion in the center section of the condenser type barrier.

In certain cases, as mentioned above, it may be suitable for the condenser barrier to be formed with a "waist" or a "belly" to obtain special advantages from the point of view of field distribution technique. As shown in FIG. 2, the center portion of the condenser barrier has a "belly" portion 18*a* substantially in the center portion of the condenser barrier. Alternatively as shown in FIG. 3, the center portion of the condenser barrier has a "waist" portion 18*b* substantially in the center portion of the condenser barrier.

The condenser barrier is fixed around the lower insulator and the conductor of the transformer winding with tube and shield in a suitable way (not shown) against the fastening flange of the bushing or against the intermediate flange.

We claim:

1. A condenser type barrier for field control of connection of a transformer bushing to the conductor of a transformer winding in converter transformers, the condenser barrier and transformer in combination comprising a condenser body of insulating material with condenser layers of foil type concentrically laid therein, the condenser barrier being in the form of a solid of revolution with an outer circular cylindrical shape and from one end with a first, inwardly-directed straight frustrum of a cone with a largest base area at the end of the condenser barrier, and lower insulator having an inner portion in the shape of a straight frustrum of a cone having a surface spaced substantially parallel to the surface of said inwardly directed straight frustrum of the cone to form a gap therebetween and a substantially cylindrical of said lower insulator attached to said cone portion, and from the other end with a second, inwardly-directed straight frustrum of a cone with a largest base area at the other end of the condenser barrier, the space between each of the straight frustrums of the cones in the condenser barrier being concentrically arranged in an open, inner, straight circular cylinder with a sectional area equal to the smallest bases of the straight frustoms of the cones; said transformer comprising a transformer casing and a fastening flange connected to said substantially cylindrical portion, and a an intermediate flange interconnecting said transformer casing and said fastening flange to surround said condenser barrier, a transformer conductor connected to said lower insulator, said condenser type barrier further comprising a tube extending from the narrow portion of said second straight frustrum of the cone through said transformer casing and said conductor passing through said tube, said tube being electrically connected to said conductor and to said condenser type barrier.

2. The combination of a condenser type barrier and a transformer according to claim 1, wherein said transformer includes a shield with a straight conically tapering shape forming a second gap between the outer surface of said shield and the inner surface of said second straight frustrum of the cone, wherein the conicity of the first, inwardly-directed straight frustrum of the cone is such that the sectional area of said gap is constant along the whole length of the first cone and the conicity of the second, inwardly-directed straight frustrum of the cone is adapted such that the sectional area of said second gap is constant along the whole length of the second cone.

3. The combination of a condenser type barrier and a transformer according to claim 1, wherein said condenser type barrier further comprises a first inner condenser layer having an axial length corresponding to the axial length of the open, inner straight circular cylinder, and wherein condenser layers concentrically laid outside of said first condenser layer consist of layers which are short in the axial direction and which are arranged so that, concurrently with an increasing radius of the condenser barrier viewing from the inner layer, they are laid in an axial direction in such a way that their outer edges will face the straight frustrums of the cones of the condenser barrier.

4. The combination of a condenser type barrier and a transformer according to claim 3, wherein the first inner condenser layer is electrically connected to the conductor of the transformer winding and an outer condenser layer is connected to ground potential.

5. The combination of a condenser type barrier and a transformer for field control according to claim 1, wherein the outer shape of the solid of revolution is formed substantially at the center portion thereof with a portion having a diameter less than the diameter of the portions of the solid of revolution to either side thereof.

6. The combination of a condenser type barrier and a transformer for field control according to claim 1, wherein the outer shape of the solid of revolution is formed substantially at the center portion thereof with a portion having a diameter greater than the diameter of the portions of the solid of revolution on either side thereof.

* * * * *